(12) United States Patent
Hayashimoto et al.

(10) Patent No.: US 7,046,317 B2
(45) Date of Patent: May 16, 2006

(54) LIQUID CRYSTAL DISPLAY APPARATUS

(75) Inventors: Seiji Hayashimoto, Kawasaki (JP); Koshu Yonemura, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 191 days.

(21) Appl. No.: 10/814,900

(22) Filed: Mar. 31, 2004

(65) Prior Publication Data
US 2004/0189891 A1    Sep. 30, 2004

(30) Foreign Application Priority Data
Mar. 31, 2003    (JP) .............................. 2003-097099

(51) Int. Cl.
  *G02F 1/335*    (2006.01)
(52) U.S. Cl. ....................................................... 349/63
(58) Field of Classification Search .................. 349/63, 349/65
See application file for complete search history.

(56) References Cited

U.S. PATENT DOCUMENTS

| | | | |
|---|---|---|---|
| 6,048,071 A * | 4/2000 | Sawayama .................. | 362/603 |
| 6,266,108 B1 * | 7/2001 | Bao et al. ...................... | 349/63 |
| 6,628,352 B1 * | 9/2003 | Sumida et al. ................. | 349/61 |
| 2001/0055076 A1 | 12/2001 | Ochi et al. | |

FOREIGN PATENT DOCUMENTS

| | | |
|---|---|---|
| JP | 08146224 | 6/1996 |
| JP | 11-283426 | 10/1999 |
| JP | 2001075093 | 3/2001 |
| JP | 2001093315 | 4/2001 |
| JP | 2002-014339 | 1/2002 |
| JP | 2002279812 | 9/2002 |

\* cited by examiner

*Primary Examiner*—Toan Ton
(74) *Attorney, Agent, or Firm*—Greer, Burns & Crain, Ltd.

(57) ABSTRACT

A liquid crystal display apparatus includes a liquid crystal panel having front and rear surfaces, a printed circuit board for driving the liquid crystal panel, and an optical waveguide for illuminating the front surface of the liquid crystal panel, the optical waveguide including first and second planes, and a thick side and a thin side, wherein the second plane is inclined with respect to the first plane, wherein the liquid crystal panel is inclined with respect to the first plane of the optical waveguide, wherein the second plane of the optical waveguide faces the liquid crystal panel, wherein a space portion having a size based on the difference between the thickness of the thick side and the thin side is situated at the thin side of the optical waveguide, and wherein at least a portion of the printed circuit board is disposed in the space portion.

3 Claims, 5 Drawing Sheets

LIQUID CRYSTAL DISPLAY APPARATUS

BACKGROUND OF THE INVENTION

1. Field of the Invention

The present invention generally relates to a liquid crystal display apparatus, and more particularly to a liquid crystal display apparatus having a front light optical waveguide.

2. Description of the Related Art

Owing to recent advances in the reduction of size and power consumption of computer apparatuses, more computer apparatuses are able to be used outdoors. A liquid crystal display apparatus, serving as an indispensable display apparatus for mobile purposes, is required to be visible in bright environments such as the outdoors, and further is desired to provide energy saving benefits. Under this situation, a reflective type display element is gaining attention. In addition to the growing demand in size reduction of related apparatuses, there is also a demand in obtaining thinner liquid crystal display apparatuses.

Although a reflective type liquid crystal display apparatus is provided in answer to such demands, the reflective type liquid crystal display apparatus has a disadvantage, for example, of being unable to be viewed under dark environments. For overcoming this disadvantage, a reflective type module, which is mounted with a front light serving as its lighting unit, is provided. The module, however, has a thickness that is yet to be reduced.

Figure 1:
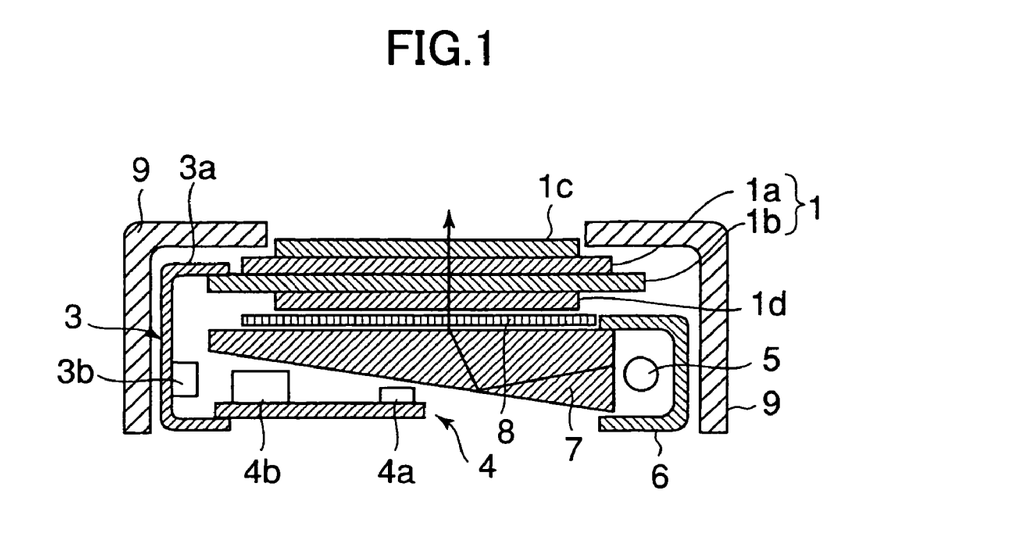
FIG. 1 is a cross-sectional view showing an exemplary conventional liquid crystal display apparatus.

As a known conventional art, transmissive liquid crystal display apparatuses using a backlight are shown in, for example, Japanese Patent Laid-Open Application Nos. 8-146224 or 2002-279812. FIG. 1 is a representative cross-sectional view of a backlight type transmissive or semi-transmissive liquid crystal display apparatus. The liquid crystal display apparatus mainly includes, for example, a liquid crystal panel 1, a driver IC package 3, a printed circuit board 4, a linear light source 5, an optical waveguide 7, and a metal casing (first metal casing) 9.

The liquid crystal panel 1 has two transparent substrates 1a, 1b serving to hold a liquid crystal, and two polarization elements 1c, 1d. The driver IC package 3 has a flexible substrate 3b on which a driver IC 3a for driving the liquid crystal panel 1 is mounted. The printed circuit board 4 has a short-sized electronic component (hereinafter referred to as "short component 4a") and a tall-sized electronic component (hereinafter referred to as "tall component 4b"). One end of the driver IC package 3 is connected to the liquid crystal panel 1, and the other end is connected to the printed circuit board 4.

A cold-cathode fluorescent tube is mainly employed as the linear light source 5. The linear light source 5 is disposed at a side portion of the optical waveguide 7, so that the light of the linear light source 5, incoming from a side of the optical waveguide 7, is incident upon the optical waveguide 7. A reflective board 6 is situated at the outer periphery of the linear light source 5 for suitably guiding light to the optical waveguide 7.

The optical waveguide 7 has a cuneatic shape, and is formed from a transparent acrylic board material. As the incident light incoming from the side of the optical waveguide 7 is repetitively reflected inside the optical waveguide 7, the entire plane facing the liquid crystal panel 1 is illuminated. An optical sheet 8 is disposed on an optical light emitting plane of the optical waveguide 7 for adjusting the direction of the light emitted from the optical waveguide 7. Furthermore, the metal casing 9 has an opening that is substantially the same shape as the display area of the liquid crystal panel 1.

The backlight type transmissive or semi-transmissive liquid crystal display apparatus provides a thin sized structure by disposing the printed circuit board 4 toward the thinner side (left side in the drawing) of the cuneatic optical waveguide 7 and disposing the tall component 4b of the printed circuit board 4 toward the thinnest part of the cuneatic optical waveguide 7. However, the backlight type transmissive or semi-transmissive liquid crystal display apparatus under bright environments, such as the outdoors, is unable to provide a satisfactory visibility since solar light or the like cancels the backlight originating from the linear light source 5 and the optical waveguide 7.

Figure 2:
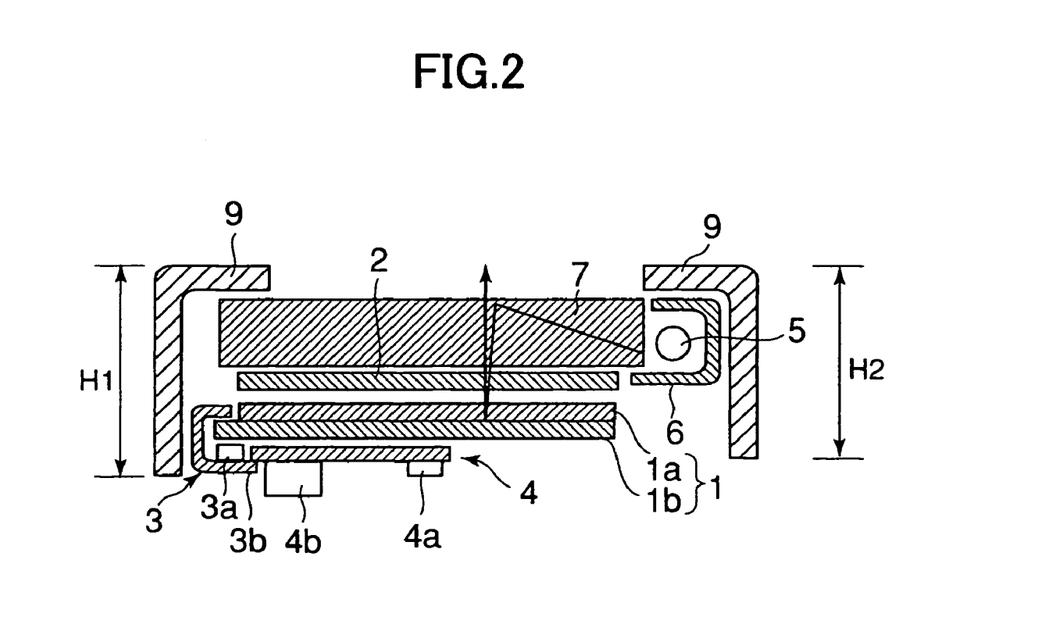
FIG. 2 is a cross-sectional view showing another exemplary conventional liquid crystal display apparatus.

FIG. 2 is a cross-sectional view of a front light type liquid crystal display apparatus that is proposed for solving such problem. In FIG. 2, like components are denoted by like numerals as of FIG. 1 and will not be further described. It is to be noted that numeral 2 indicates a polarization element.

In the front-light type liquid crystal display apparatus, the position between the liquid crystal panel 1 and the optical waveguide 7 is flipped (reversed) for allowing the optical waveguide 7 to illuminate a display portion of the liquid crystal panel 1 from the front. Furthermore, with the front-light type liquid crystal display apparatus, the optical waveguide 7 is shaped as a cuboid.

Although the front-light type liquid crystal display apparatus is able to solve the aforementioned visibility problem, it raises a problem of increasing the thickness of the liquid crystal display apparatus owing to the cuboid shape of the optical waveguide 7. More specifically, since the printed circuit board 4 is disposed on the backside of the liquid crystal panel 1 by bending of the driver IC package 3, the thickness H1 of the side (left side in FIG. 2) where the printed circuit board 7 is situated becomes larger than the thickness H2 of the side (right side in FIG. 2) opposite to the side where the printer circuit board 7 is situated.

Figure 3:
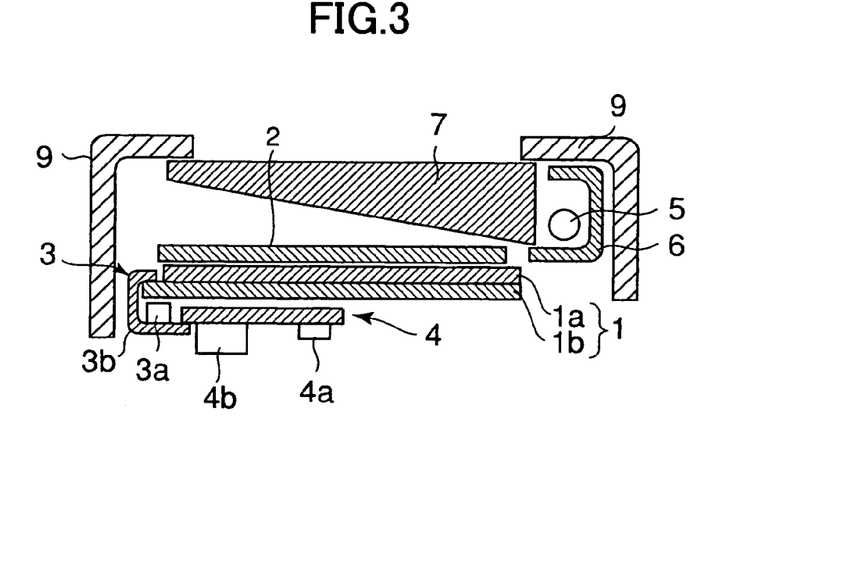
FIG. 3 is a cross-sectional view showing another exemplary conventional liquid crystal display apparatus.

FIG. 3 shows another front-light type liquid crystal display apparatus which uses a cuneatic optical waveguide 7. However, as shown in the drawing, an unnecessary space is created between the liquid crystal panel 1 and the optical waveguide 7, thereby precluding reduction of the thickness of the liquid crystal display apparatus. Therefore, although this front-light type liquid crystal display apparatus provides a sufficient visibility in bright environments such as the outdoors, the problem of being unable to reduce thickness remains unsolved.

SUMMARY OF THE INVENTION

It is a general object of the present invention to provide a liquid crystal display apparatus that substantially obviates one or more of the problems caused by the limitations and disadvantages of the related art.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by a liquid crystal display apparatus particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides a liquid crystal display apparatus including: a liquid crystal panel having front and rear surfaces; a printed circuit board for driving the liquid crystal panel; and an optical waveguide for illuminating the front surface of the liquid crystal panel, the optical waveguide including first and second planes, and a thick side and a thin side, wherein the second plane is inclined with respect to the first plane; wherein the liquid crystal panel is inclined with respect to the first plane of the optical waveguide, wherein the second plane of the optical waveguide faces the liquid crystal panel, wherein a space portion having a size based on the difference between the thickness of the thick side and the thin side is situated at the thin side of the optical waveguide, and wherein at least a portion of the printed circuit board is disposed in the space portion.

According to an embodiment of the present invention, the liquid crystal panel may be inclined with respect to the first plane of the optical waveguide at an angle that is no less than 0.2 degrees and no more than 1.0 degrees.

According to an embodiment of the present invention, the liquid crystal display apparatus may further include a flexible substrate to which the liquid crystal panel and the printed circuit board are connected, wherein the flexible substrate is bent so that at least a portion of the printed circuit board is disposed in the space portion.

Furthermore, the present invention provides a liquid crystal display apparatus including: a liquid crystal panel having front and rear surfaces; an optical waveguide for illuminating the front surface of the liquid crystal panel; a first casing including a front panel part and a depending part depending from the front panel part, the front panel part being disposed above the optical waveguide; a second casing including a bottom panel part and an upright part projecting upright from the bottom panel part, the bottom panel part being disposed below the reflective liquid crystal panel, and the upright part being in cooperative engagement with the depending part; and a third casing disposed between the front panel part and the bottom panel part and being in cooperative engagement with the upright part to restrict movement between the first and second casings.

According to an embodiment of the present invention, the depending part may have an opening and the upright part may include a protruding part that extends through the opening and engages a wall of the opening, and wherein the third casing may include a claw part in abutting relation with the protruding part to restrict movement between the first and second casings.

Other objects and further features of the present invention will be apparent from the following detailed description when read in conjunction with the accompanying drawings.

DESCRIPTION OF THE PREFERRED EMBODIMENTS

In the following, embodiments of the present invention will be described with reference to the accompanying drawings.

Figure 5:
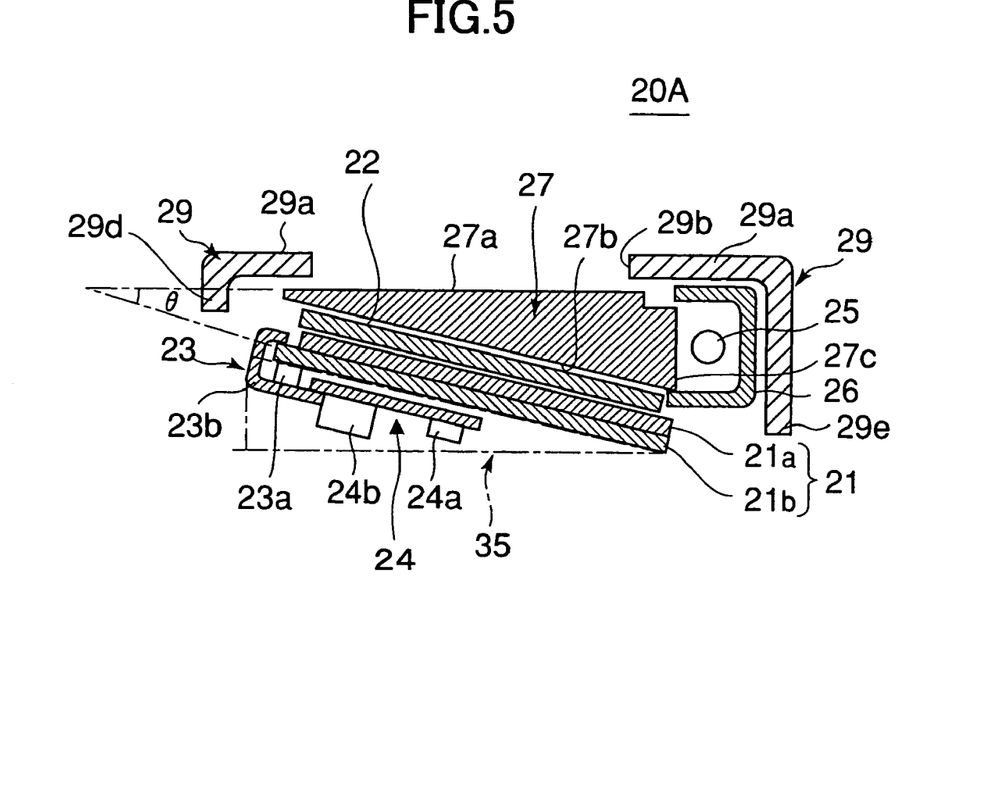
FIG. 5 is a cross-sectional view showing a liquid crystal display apparatus according to a first embodiment of the present invention.

FIG. 5 is a cross-sectional view showing a liquid crystal display apparatus 20A according to a first embodiment of the present invention. The liquid crystal display apparatus 20A is a front-light type liquid crystal display apparatus which mainly includes, for example, a liquid crystal panel 21, a driver IC package 23, a printed circuit board 24, a linear light source 25, a front-light optical waveguide 27 (hereinafter referred to as "waveguide 27"), and a first casing 29 made of metal, for example.

The liquid crystal panel 21 includes two transparent substrates 21a, 21b, and a liquid crystal held therebetween. The driver IC package 23 has a flexible substrate 23b to which a driver IC 23a for driving the liquid crystal panel 21 is mounted.

The printed circuit board 24 has a short-sized electronic component 24a (hereinafter referred to as "short component 24a") and a tall-sized electronic component 24b (hereinafter referred to as "tall component 24b"). One end of the driver IC package 23 is connected to the liquid crystal panel 21 and the other end is connected to the printed circuit board 24. A flexible substrate 23b of the driver IC package 23 is bent so that the printed circuit board 24 is situated at the backside of the liquid crystal panel 21.

The linear light source 25, which may be a cold-cathode fluorescent tube for example, is disposed facing a side plane 27c of the optical waveguide 27. Thereby, the light from the light source 25 is incident upon the optical waveguide 27 from the side plane 27c thereof. A reflective board 26 is situated at the outer periphery of the linear light source 25 for suitably guiding light to the optical waveguide 27. The linear light source 25, the reflective board 26, and the optical waveguide 27 form a front-light for illuminating the liquid crystal panel 21 from the front side.

The optical waveguide 27 employed in this embodiment is formed from a transparent acrylic board material. The optical waveguide 27 has a cuneatic shape which has a first plane 27a, and a second plane 27b inclined with an angle of, for example, 0.2° through 1° with respect to the first plane 27a.

More specifically, the shape of the optical waveguide 27, from a cross-sectional view, is more or less a triangle formed by a line segment of the first plane 27a, a line segment of the second plane 27b, and a line segment of the side plane 27c. Such shape of the optical waveguide 27 is defined as a cuneatic shape in this embodiment.

The first plane 27a is the outermost surface of the liquid crystal display apparatus 20A, and is disposed substantially parallel to a front panel part 29a of the first casing 29. The second plane 27b is disposed facing the liquid crystal panel 21 and irradiates light to the liquid crystal panel 21.

As the incident light from the side plane 27c of the optical waveguide 27 is repetitively reflected inside the optical waveguide 27, the second plane 27b facing the liquid crystal panel 21 is illuminated. It is to be noted that a polarization element 22 that conducts polarization is disposed between the first plane 27a and the liquid crystal panel 21.

The first casing 29 has an opening that is substantially the same shape as the display area of the liquid crystal panel 21. The first casing 29, which has installed therein the liquid crystal panel 21, the driver IC package 23, the printed circuit board 24, the linear light source 25, and the optical waveguide 27, serves to protect such components. It is to be noted that the height (length) H3, H4 of the respective left and right side planes (see FIG. 6) of the first casing 29 are different. The reason for this difference is described below.

Next, the positional relation between the liquid crystal panel 21 and the optical waveguide 27 is described. As described above, the optical waveguide 27 has a cuneatic shape which has the first plane 27a serving as the outermost surface of the liquid crystal display apparatus 20A, and the second plane 27b inclined with a prescribed angle with respect to the first plane 27a. Further, the first plane 27a is disposed substantially parallel to the front panel part 29a of the first casing 29. Accordingly, the second plane 27b is disposed as an inclined plane inside the liquid crystal display apparatus 20A.

According to the exemplary embodiment according to the present invention, the liquid crystal panel 21 is disposed along the inclined second plane 27b. In the illustrated exemplary embodiment, the liquid crystal panel 21 is substantially parallel to the second plane 27b. By disposing the liquid crystal panel 21 along the second plane 27b, the liquid crystal panel 21 will be inclined with respect to the first plane 27a. In such a case, the liquid crystal panel 21 will be inclined at an angle of θ (see FIG. 5) with respect to the first plane 27a, in which the angle θ is set to satisfy a relation of $0.20° \leq θ \leq 1°$.

Thus, by setting the inclination angle θ of the liquid crystal panel 21 with respect to the first plane 27a, size reduction of the liquid crystal display apparatus 20A can be satisfactorily achieved without adversely affecting the quality of a displayed image. That is, in a case where the inclination angle θ of the liquid crystal panel (for example, reflective type liquid crystal panel) 21 with respect to the first plane 27a of the optical waveguide 27 exceeds 1°, the inclination of the liquid crystal panel 21 will be so large that the quality of the displayed image will deteriorate. More specifically, the liquid crystal display apparatus 20A exhibits deleterious effects in a case where the inclination angle θ of the liquid crystal panel (reflective type liquid crystal panel) 21 with respect to the first plane 27a of the optical waveguide 27 exceeds 1°; meanwhile, the liquid crystal display apparatus 20A exhibits little or no such deleterious effects when the angle 0 is no more than 1°.

In a case where the inclination angle θ of the liquid crystal panel (reflective type liquid crystal panel) 21 with respect to the first plane 27a of the optical waveguide 27 is below 0.2°, the liquid crystal panel 21 will be substantially parallel to the first plane 27, and may thereby leave insufficient space in which to dispose the printed circuit board 24. On the other hand, in a case, for example, where the angle θ is 1°, and where the display size is 10.4 inches, the difference in thickness between the thick side and the thin side of the cuneatic optical waveguide 27 will be approximately 2.8 mm, and will thereby leave sufficient space portion (space portion indicated with numeral 35 and illustrated with a dash-dot line in FIG. 5) for disposing the driver IC 23a and the printed circuit board 24.

Accordingly, the liquid crystal panel 21 and the polarization element 22 are disposed with an angle θ that is preferably no more than 1° with respect to the outermost surface of the liquid crystal display apparatus 20A, and further, the printed circuit board 24 and the driver IC 23a are disposed on the thinner side of the cuneatic optical waveguide 27. Thereby, the liquid crystal display apparatus (front-light type liquid crystal display apparatus) 20A is able to provide sufficient visibility even under bright environments, such as the outdoors.

Furthermore, the space portion 35 is obtained where there is a larger space at the thinner side of the cuneatic optical waveguide 27 than the thicker side of the optical waveguide 27. In this exemplary embodiment according to the present invention, the space portion 35, particularly the space at the thinner side of the optical waveguide 27, is utilized so that the printed circuit board 24 may be disposed at the space portion 35. Thus structured, the creation of unnecessary space in the liquid crystal display apparatus 20A can be prevented or at least significantly reduced, to thereby achieve size-reduction of the liquid crystal display apparatus 20A.

It is to be noted that the thinner side of the optical waveguide 27 and the thicker side of the optical waveguide 27 may be distinguished by employing an average thickness value W3 between the thickness W1 of the thinnest part of the optical waveguide 27 (left end part of the optical waveguide 27 in FIG. 5) and the thickness W2 of the thickest part of the optical waveguide 27 (right end part of the optical waveguide 27 in FIG. 5) (W3=(W1+W2)/2) as a criterion and determining whether a thickness is greater or less than the criterion.

Figure 6:
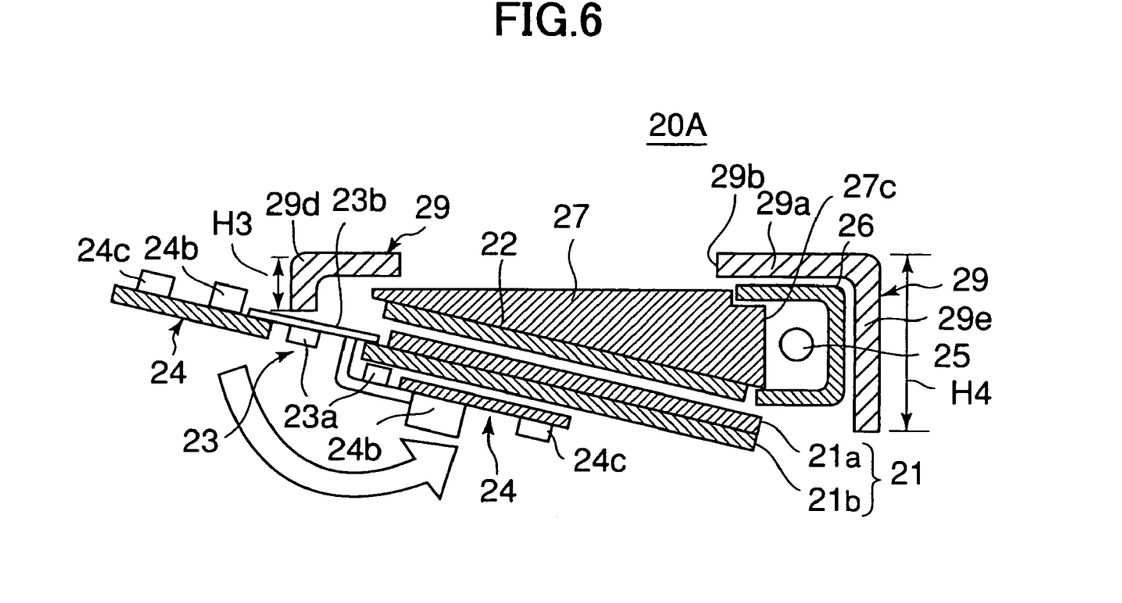
FIG. 6 is a drawing for describing a process of assembling a liquid crystal display apparatus according to the first embodiment of the present invention.

FIG. 6 is a diagram for describing a process (method) for assembling the above-described liquid crystal display apparatus 20A. In the assembling process, the driver IC package 23, as illustrated with the arrow in FIG. 6, is bent back over itself 180 degrees in a bending step.

In the bending step for the liquid crystal display apparatus 20A with the inclined liquid crystal panel 21 according to an embodiment of the present invention, the liquid crystal panel 21, the driver IC package 23, and the printed circuit board 24 are substantially arranged along a straight line when the driver IC package 23 is in a flat state (an unbent state), wherein the straight line extends diagonally upwards to the left in accordance with the inclination (See FIG. 6).

If the first casing 29 was to be formed in a manner extending far downwards (FIG. 6), the first casing 29, prior to the bending step, would become an obstacle preventing the liquid crystal panel 21, the driver IC package 23, and the printed circuit board 24 from being arranged along the straight line, and causing difficulty in operability during the assembly of the liquid crystal display apparatus 20A.

Therefore, according to an embodiment of the present invention, the length H3 of a sidewall part 29d of the first casing 29 situated on the side at which the driver IC package 23 is disposed (left side in FIGS. 5 and 6), is set to be shorter than the length H4 of a sidewall part 29e of the first casing 29 situated on the side at which the linear light source 25 is disposed (right side in FIGS. 5 and 6) (H3<H4). Accordingly, prior to the bending step, the first casing 29 serves as no obstacle in disposing the liquid crystal panel 21, the driver IC package 23, and the printed circuit board 24 along the straight line, and causes no difficulty in operability during the assembly of the liquid crystal display apparatus 20A.

In an embodiment of the present invention, the printed circuit board 24 and the liquid crystal panel 21 are, as described above, connected with the flexible substrate 23b (driver IC package). Therefore, the printed circuit board 24 can be easily and reliably disposed in the space portion 35 provided at the thinner side of the optical waveguide 27. Accordingly, size-reduction of the liquid crystal display apparatus 20A can be satisfactorily achieved.

Next, a second embodiment according to the present invention is described.

As described with the liquid crystal display apparatus 20A in the first embodiment according to the present invention, the length H3 of the sidewall part 29d of the first casing 29 is set to be shorter than the length H4 of the sidewall part 29e of the first casing 29 (H3<H4), so that operability during the assembly of the liquid crystal display apparatus 20A is improved.

Although the liquid crystal display apparatus 20A may be satisfactorily assembled by shortening the length H3 of the sidewall part 29d of the first casing 29, such shortening of the sidewall part 29d may, however, reduce the primary function of the first casing 29 in protecting the components disposed therein. More specifically, as shown in FIG. 5, the driver IC package 23 is disposed in a manner exposed to the external, and therefore, there is a possibility that external stress will be applied directly to the driver IC package 23, and that the strength of the liquid crystal display apparatus 20A will be reduced.

Figure 4:
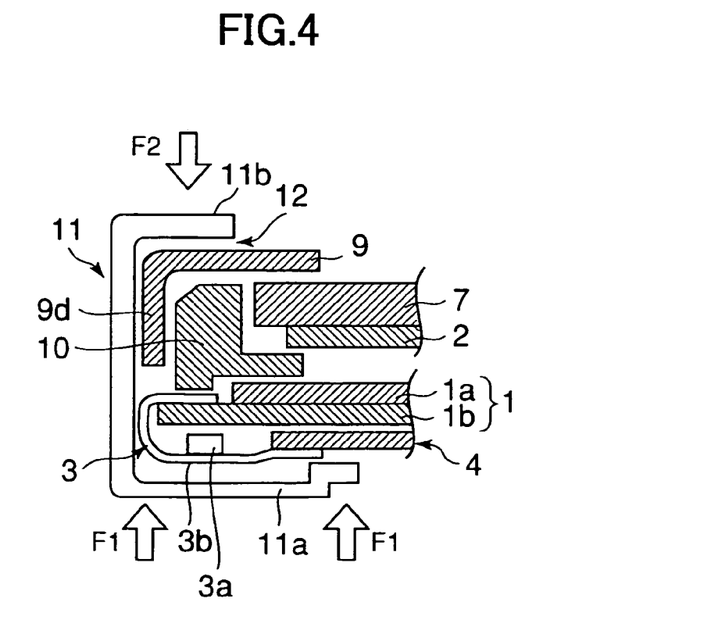
FIG. 4 is an enlarged cross-sectional view showing a part of a liquid crystal display apparatus provided with a structure for protecting a driver IC.

FIG. 4 is a drawing for describing a conventionally applied structure for solving the above exposure problem. In addition to the first metal casing 9, the liquid crystal display apparatus shown in FIG. 4 also includes a plastic casing 10 and a second metal casing 11. For convenience, FIG. 4 shows an exemplary structure where the plastic casing 10 and the second metal casing 11 are provided to the liquid crystal display apparatus of FIG. 2.

In the exemplary structure shown in FIG. 4, since the length of the sidewall part 9d of the first metal casing 9 is short, the second metal casing 11 having a square bracket-like shape is disposed at the sidewall part 9d of the first metal casing 9 as a reinforcement. The second metal casing 11 sandwiches the components disposed between the first metal casing 9, being the outermost (topmost) surface, and the driver IC package 3, being the lowermost surface, to thereby protect the components.

Although the second metal casing 11 is able to reinforce the components (e.g. liquid crystal panel 1) to a certain degree by sandwiching the components in a vertical direction, the second metal casing 11 is moved upward when a force (indicated with arrow F1) is applied to a bottom plane 11a of the second metal casing 11 since the second metal casing 11 is an integrated body having no movement restricting mechanism. In a case where the second metal casing 11 is moved upward, a gap 12 between the first metal casing 9 and a top plane 11b becomes larger, to thereby cause shakiness at the optical waveguide 7 and the liquid crystal panel 1, and prevent the components from being securely held.

Figure 7:
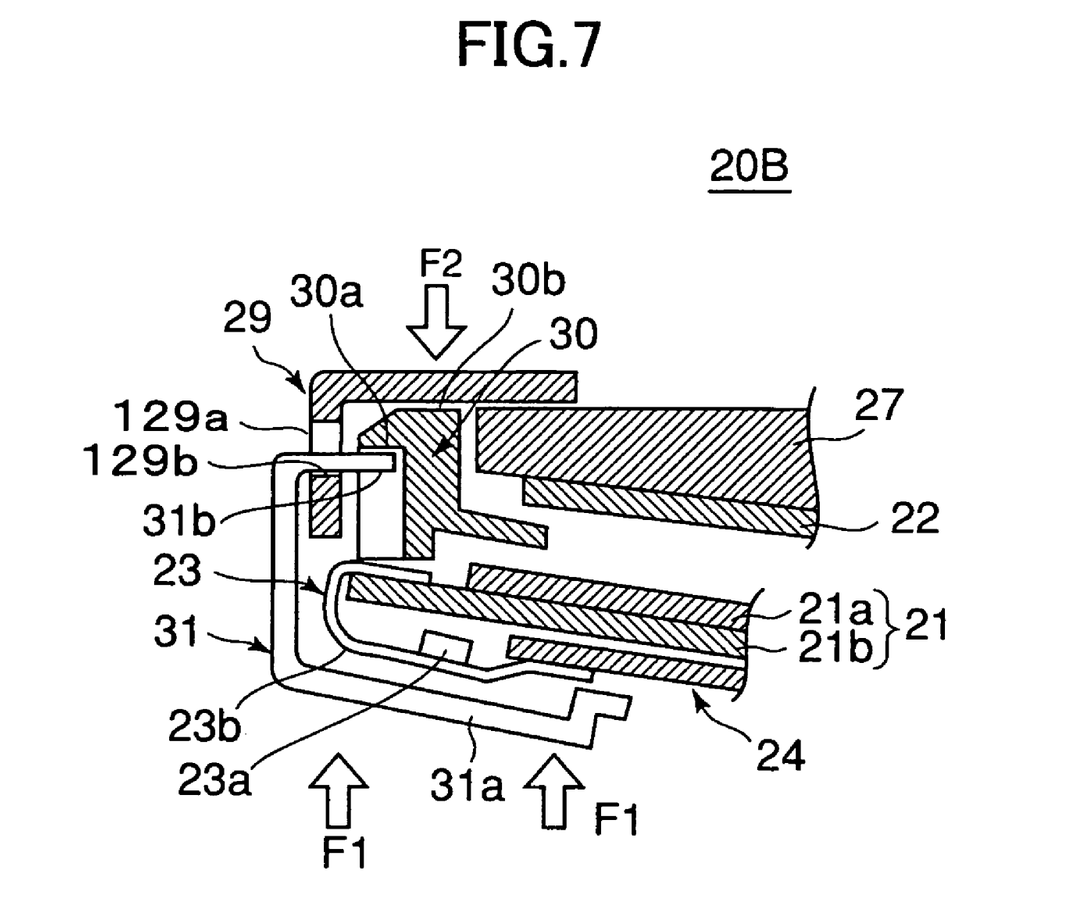
FIG. 7 is an enlarged cross-sectional view showing the proximity of a driver IC of a liquid crystal display apparatus according to a second embodiment of the present invention.
Figure 8:
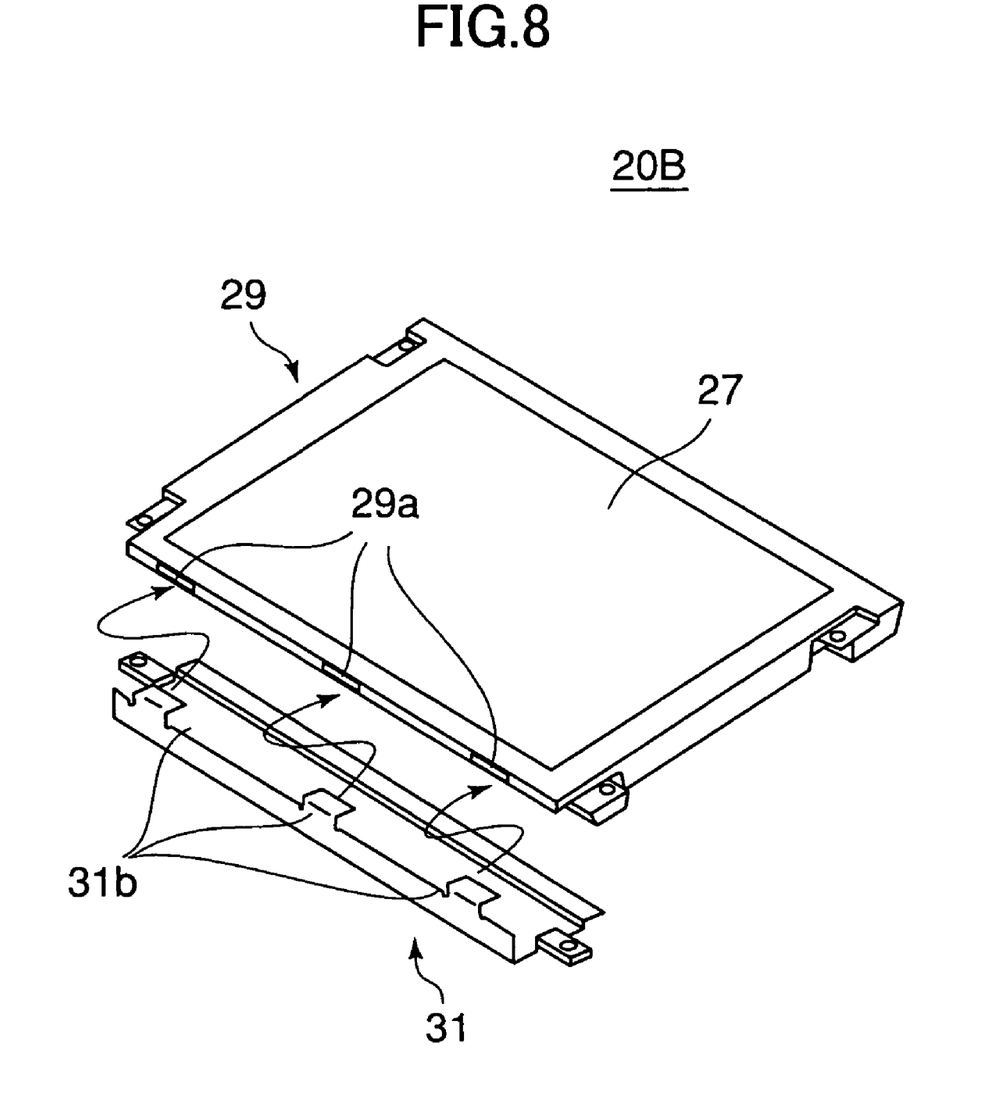
FIG. 8 is a perspective view showing a detached state of a second metal casing of a liquid crystal display apparatus according to the second embodiment of the present invention.

In an embodiment according to the present invention shown in FIGS. 7 and 8, an opening 129a is formed in the first casing 29, and a protruding part 31b is formed in a manner protruding inward from an upper end part of a second casing 31 made of metal, for example. Furthermore, a claw part 30a of a third casing 30 made of plastic for example, is disposed between the protruding part 31b, inserted through the opening 129a, and an inner wall of the first casing 29.

As shown in FIG. 8, a plurality of the protruding parts 31b are formed as part of the second casing 31. Furthermore, a plurality of openings 129a are formed in a side surface of the first casing 29 and positioned in correspondence to the protruding parts 31b.

The second casing 31 is attached to the first casing 29 by inserting the protruding parts 31b into the openings 129a. Accordingly, the protruding parts 31b engage inner walls 129b of the openings 129a and the claw parts 30a disposed in the third casing 30. That is, the claw parts 30a of the third casing 30 are positioned between the protruding parts 31b and the inner wall of the first casing 29. Therefore, the claw parts 30a (restricting mechanism), which restricts the movement between the first casing 29 and the second casing 31, regulates (restricts) the relative movement between the first casing 29 and the second casing 31.

It is to be noted that the operation of inserting the protruding parts 31b into the openings 129a is conducted easily since the protruding parts 31b are inserted into and/or aligning the openings 129a after the positioning of the protruding parts 31b and the openings 129a.

With the liquid crystal display apparatus 20B according to an embodiment of the present invention, the third casing 30 (restricting mechanism) restricts the relative movement between the first casing 29 and the second casing 31. Therefore, displacement of the components disposed therein (e.g. the liquid crystal panel 21, the printed circuit board 24, the optical waveguide 27) is restricted so that the components can be positively protected.

Accordingly, in a case where the external force indicated with the arrow F1 in FIG. 7 is applied to the bottom panel part 31a of the second casing 31, the second casing 31 is subject to an upward urging force attempting to separate the protrusion parts 31b from the inner walls 129b that form the openings 129a. However, owing to the engagement between the claw parts 30a of the third casing 30 and the protruding parts 31b, and the abutment of the upper end part 30b of the third casing 30 against the inner wall of the first casing 29, very little or no displacement occurs between the first and second metal casings. 29, 31, being that they are securely engaged to each other, even when such external force F1 is applied.

In a case where an external force indicated with an arrow F2 is applied, the first casing 29 is subject to a downward urging force (F2) attempting to move the first casing 29 downward. However, in this situation, the first casing 29 downwardly abuts against the third casing 30, to thereby cause claw parts 30b of the third casing 30 to urge the protruding parts 31b against the inner walls 29b of the openings 129a. Accordingly, little or no displacement occurs between the first and second metal casings 29, 31, being that they are securely engaged to each other, even when such external force F2 is applied.

With the liquid crystal display apparatus 20B according to an embodiment of the present invention, the first and second metal casings 29, 31 serve to positively protect components disposed therein (e.g. the liquid crystal panel 21, the printed circuit board 24, the optical waveguide 27). Therefore, size-reduction of the liquid crystal display apparatus 20B can be achieved without having to expose electronic or optical components disposed inside the liquid crystal display apparatus 20B to the external. Accordingly, a reliable liquid crystal display apparatus 20B can be obtained.

It is to be noted that, although the driver IC 23a is disposed at the inner side of the flexible substrate 23b in the aforementioned exemplary embodiments, the driver IC 23a may also be disposed at the outer side of the flexible substrate 23b. Furthermore, although the light source 25 is a cold-cathode fluorescent tube in the aforementioned exemplary embodiments, the light source 25 may be any suitable light source, for example, an LED (light emitting diode), and/or a point source. Furthermore, although the short and long components 24a, 24b are disposed on the outer surface of the printed circuit board 24, the short and long components 24a, 24b may alternatively be disposed on the inner side of the printed circuit board 24.

In consequence, according to an embodiment of the present invention, since the printed circuit board is able to be disposed at the space portion formed on the thinner side of the optical waveguide (front-light optical waveguide), size-reduction of the liquid crystal display apparatus can be achieved.

According to an embodiment of the present invention, both size-reduction of the liquid crystal apparatus and prevention of deterioration in the quality of the displayed image can be accomplished.

According to an embodiment of the present invention, since the printed circuit board can be easily and positively disposed at the space portion formed on the thinner side of the optical waveguide (front-light optical waveguide) by using the flexible substrate, size-reduction of the liquid crystal display apparatus can be efficiently accomplished.

According to an embodiment of the present invention, since the displacement of the liquid crystal panel (reflective liquid crystal panel), the printed circuit board, and the optical waveguide (front-light optical waveguide) disposed inside the liquid crystal display apparatus is restricted by employing the restricting mechanism to restrict the relative movement between the first and second metal casings, the components of the liquid crystal display apparatus can be positively protected.

According to an embodiment of the present invention, a restricting mechanism having a simple structure can be facilitated.

Further, the present invention is not limited to these embodiments, but various variations and modifications may be made without departing from the scope of the present invention.

The present application is based on Japanese priority application No. 2003-097099 filed on Mar. 31, 2003, with the Japanese Patent Office, the entire contents of which are hereby incorporated by reference.

What is claimed is:

1. A liquid crystal display apparatus comprising:
a liquid crystal panel having front and rear surfaces;
a printed circuit board for driving the liquid crystal panel; and
an optical waveguide for illuminating the front surface of the liquid crystal panel, the optical waveguide including first and second planes, and a thick side and a thin side, wherein the second plane is inclined with respect to the first plane;
wherein the liquid crystal panel is inclined with respect to the first plane of the optical waveguide,
wherein the second plane of the optical waveguide faces the liquid crystal panel,
wherein a space portion having a size based on the difference between the thickness of the thick side and the thin side is situated at the thin side of the optical waveguide, and
wherein at least a portion of the printed circuit board is disposed in the space portion.

2. The liquid crystal display apparatus as claimed in claim 1, wherein the liquid crystal panel is inclined with respect to the first plane of the optical waveguide at an angle that is no less than 0.2 degrees and no more than 1.0 degrees.

3. The liquid crystal display apparatus as claimed in claim 1, further comprising a flexible substrate to which the liquid crystal panel and the printed circuit board are connected, wherein the flexible substrate is bent so that at least a portion of the printed circuit board is disposed in the space portion.

* * * * *